Patented Oct. 28, 1930

1,779,676

UNITED STATES PATENT OFFICE

JEROME MARTIN AND IGNACE J. KRCHMA, OF TERRE HAUTE, INDIANA, ASSIGNORS TO COMMERCIAL SOLVENTS CORPORATION, OF TERRE HAUTE, INDIANA, A CORPORATION OF MARYLAND

PRODUCTION OF ACETONE FROM ACETYLENE

No Drawing.    Application filed May 18, 1929.   Serial No. 364,314.

Our invention relates to a process and a catalyst for the production of acetone from acetylene and water vapor.

We are aware of the fact that in the past several investigators have recommended processes for the production of acetone from acetylene and water vapor. The Elektrizitatswerke Lonza (British Patent 192,392) described a process whereby a mixture of 1 part of acetylene and 2 to 5 parts of steam was passed at a temperature ranging from 350° to 450° C. over a catalyst comprising a double salt of thorium with an alkali metal or an alkaline earth metal. According to Austrian Patent No. 88,632, acetone may be obtained by passing a mixture composed of 1 volume of acetylene and 40 volumes of water vapor over catalysts comprising naturally occurring forms of iron such as roasted pyrites, argillaceous iron ore, spathic iron ore, etc. Austrian Patent No. 88,631 specifies that the catalysts be as rich as possible in iron oxide, such as those obtained by precipitating the oxide from iron hydroxide and compressing it into the form of tablets. Stuer and Grob (U. S. P. 1,421,743) state that when acetylene mixed with a small amount of steam is passed at a suitable temperature over bog iron ore, acetone, together with a number of other products, is formed. More recently, the Holzverkohlungs-Industrie Akt.-Ges. (Fr. P. 642,111) has described the preparation of acetone by passing a mixture of 1 part of acetylene to 4-15 volumes of water vapor at temperatures ranging from 250° C. to 750° C. over suitable catalysts. Catalysts specified are oxygen compounds of iron, in combination with such compounds as manganese oxide, barium carbonate, zinc carbonate, aluminum oxide, lime and magnesia.

One of the most efficient of all of the different types of catalysts which we have investigated is that of the character disclosed in United States Patents Nos. 1,625,924, 1,625,925, 1,625,926, 1,625,927, 1,625,928, 1,625,929, issued April 26, 1927, for use in the production of synthetic methanol. These catalysts comprise a plurality of difficultly reducible metal oxides, a plurality of easily reducible metal oxides, and a metallic halide, as, for example, zinc oxide, iron oxide, and zinc chloride.

Below will be found a description of the composition and method of preparing a number of suitable catalysts of this character. It is distinctly understood, however, that these examples are cited merely as illustrative of the character of the catalyst mixtures which we prefer to use and that we are in no way bound to the use of only the specific examples cited. Many other combinations may also be satisfactorily employed in our process.

*Example I*

160 grams chromium nitrate $$(Cr(NO_3)_3.9H_2O)$$

are dissolved, with heating, in 60 cc. water. After the solution has cooled, 10 grams zinc chloride and 96 grams ferric nitrate are added. To the resulting cold solution, 100 grams zinc oxide are then added with constant stirring. The resulting wet mass is heated in a porcelain evaporating dish to dryness and then placed in a copper crucible which is heated over a Fletcher burner to drive off the fumes of nitrogen oxides. The material thus obtained is crushed sufficiently to pass a 65 mesh screen and to it 8.2 grams zinc chloride dissolved in 60 cc. water are added. The product thus obtained hardens spontaneously.

*Example II*

8 kilograms of chromic nitrate $$(Cr(NO_3)_3.9H_2O)$$

and 1.5 kilograms of nickel nitrate $$(Ni(NO_3)_2.6H_2O)$$

are dissolved in 150 liters of water, and to this solution there is added the theoretical amount (5.4 liters of 12.75 normal) of ammonium hydroxide to precipitate chromium hydroxide and nickel hydroxide. The solution is then centrifuged to recover the precipitated hydroxides and the resultant precipitate is thoroughly washed with water, dried, and broken up into granules. The resultant granules are moistened with an aqueous solution of 200 grams zinc chloride and again dried.

*Example III*

8 kilograms of chromic nitrate $$Cr(NO_3)_3 \cdot 9H_2O$$

are dissolved in 5 liters of water and 5 kilograms of zinc oxide added with stirring. The product thus obtained is evaporated to dryness and heated until the chromic nitrate is converted to chromic oxide. This material is then mixed with 10% of dextrin or a similar agglutinating agent and 6–10% of zinc chloride, dissolved in 10 parts of water. The mixture is then dried, broken up and sieved thru a 65 mesh screen.

Other examples of catalyst mixtures of similar character to the above may be obtained by suitably combining materials of the following types:

(1) One or more non-reducible metal oxides such as zinc, magnesium, cadmium, chromium, vanadium, tungsten, etc.

(2) One or more easily reducible metal oxides such as copper, silver, iron, nickel, cobalt, etc.

(3) A metallic halide.

Under ordinary circumstances freshly reduced metals such as iron, cobalt and nickel at elevated temperatures decompose acetylene to carbon and hydrogen. The hydrogen resulting from the decomposition of one portion of the gas may then react with a fresh portion to form ethylene and ethane. In our improved catalyst combinations, however, this action does not take place, or only to a slight extent.

As the result of a series of experiments carried out under similar conditions with all of the known types of catalysts favoring the production of acetone from acetylene and water vapor, we have found that the catalysts of the types which have been described above give more efficacious results than any of the others. For example, when passing a mixture composed of 0.12 mols per hour of acetylene and 1.8 mols per hour of water vapor over 20 cubic centimeters of the catalyst described under Example I above, at a temperature ranging from 465°–485° C., a conversion of 25.0% of the acetaylene to acetone was obtained. Under exactly similar conditions with the amount of water vapor increased to 2.0 mols per hour, a conversion of 32.0% was obtained.

Acetone may be obtained from acetylene and water vapor by the aid of our catalyst thru a fairly wide rang of operating conditions. The temperature may be varied from approximately 275° to approximately 725° C. but the optimum range appears to be from about 450° to about 550° C. The proportion of acetylene to water vapor may also be varied considerably, it being possible to use from about 5 to about 40 volumes of water vapor for each volume of acetylene, but it is generally found preferable to maintain the ratio of water vapor to acetylene within the limits of about 5 to 20 of the former to 1 of the latter. If desired, the residual acetylene, after being separated from the acetone, may again be passed over the catalyst. In such a case, however, it is usually desirable that additional acetylene or water vapor be added in order to bring the reaction mixture back to its optimum constitution.

Now having described our invention, we claim the following as new and novel:

1. A process for the production of acetone which comprises passing a gaseous mixture comprising acetylene and an excess of water vapor at temperatures ranging from 275° C. to 725° C. over catalysts initially comprising a plurality of difficultly reducible metal oxides, a plurality of easily reducible metal oxides, and a metallic halide.

2. A process for the production of acetone which comprises passing a mixture of one part acetylene and from about 5 to about 40 parts of water vapor at temperatures from about 450° to about 550° C. over catalysts initially comprising a plurality of difficultly reducible metal oxides, a plurality of easily reducible metal oxides, and a metallic halide.

3. A process for the production of acetone which comprises passing a mixture of one part acetylene and from about 5 to about 40 parts of water vapor at temperatures from about 450° to about 550° C. over catalysts initially comprising a plurality of difficultly reducible second group metal oxides, a plurality of difficultly reducible metal oxides from the third to seventh groups and a metallic halide.

4. A process for the production of acetone which comprises passing a mixture of one part of acetylene and from about 5 to about 40 parts of water vapor at temperatures from about 450° to about 550° C. over catalysts initially comprising zinc oxide, chromium oxide, iron oxide, and zinc chloride.

5. A process for the production of acetone which comprises passing a gaseous mixture comprising acetylene and an excess of water vapor at temperatures ranging from 275° C. to 725° C. over catalysts initially comprising a plurality of difficulty reducible metal oxides, an easily reducible metal oxide, and a metallic halide.

6. A process for the production of acetone which comprises passing a gaseous mixture comprising acetylene and an excess of water vapor at temperatures ranging from 275° C. to 725° C. over catalysts initially comprising a difficultly reducible metal oxide, an easily reducible metal oxide and a metallic halide.

7. A process for the production of acetone which comprises passing a gaseous mixture comprising acetylene and an excess of water vapor at temperatures ranging from 275° C. to 725° C. over catalysts initially comprising zinc oxide, chromium oxide, iron oxide, and zinc chloride.

In testimony whereof we affix our signatures.

JEROME MARTIN.
IGNACE J. KRCHMA.